(12) United States Patent
Takasu et al.

(10) Patent No.: US 8,711,482 B2
(45) Date of Patent: Apr. 29, 2014

(54) PRESSING MOLD FOR OPTICAL LENSES AND METHOD FOR MANUFACTURING GLASS OPTICAL LENSES

(75) Inventors: Yoshifumi Takasu, Osaka (JP); Naomi Kishimoto, Osaka (JP); Yuta Moriyama, Osaka (JP); Tooru Furushige, Osaka (JP)

(73) Assignee: Panasonic Corporation, Osaka (JP)

( * ) Notice: Subject to any disclaimer, the term of this patent is extended or adjusted under 35 U.S.C. 154(b) by 677 days.

(21) Appl. No.: 12/956,092

(22) Filed: Nov. 30, 2010

(65) Prior Publication Data
US 2011/0134531 A1 Jun. 9, 2011

(30) Foreign Application Priority Data
Dec. 4, 2009 (JP) ................................. 2009-276465

(51) Int. Cl.
*G02B 5/18* (2006.01)

(52) U.S. Cl.
USPC ............. 359/574; 359/900; 264/1.1; 264/2.5

(58) Field of Classification Search
None
See application file for complete search history.

(56) References Cited

U.S. PATENT DOCUMENTS

| | | | |
|---|---|---|---|
| 4,139,677 A | 2/1979 | Blair et al. | |
| 4,168,961 A | 9/1979 | Blair | |
| 4,629,487 A | 12/1986 | Monji et al. | |
| 2010/0254006 A1* | 10/2010 | Ueno et al. | 359/566 |

FOREIGN PATENT DOCUMENTS

| | | | |
|---|---|---|---|
| CN | 1292770 A | | 4/2001 |
| CN | 1792906 A | | 6/2006 |
| EP | 1061051 A1 | | 12/2000 |
| JP | 52-045613 | | 4/1977 |
| JP | 54-110857 A | | 8/1979 |
| JP | 55-057807 A | | 4/1980 |
| JP | 60-246230 A | | 5/1985 |
| JP | 60-025761 | | 6/1985 |
| JP | 2006162863 A | * | 6/2006 |
| WO | WO 2009057772 A1 | * | 5/2009 |

OTHER PUBLICATIONS

Chinese Search Report for Application No. 201010588412.3.

* cited by examiner

*Primary Examiner* — Arnel C Lavarias
(74) *Attorney, Agent, or Firm* — RatnerPrestia

(57) ABSTRACT

A pressing mold for optical lenses, which molds a ring-zone-type diffraction lens having a plurality of concentric ring zones, the mold including: diffraction action transfer surfaces configured to form diffraction action surfaces that diffract light passing through the diffraction lens; and step transfer surfaces configured to form step surfaces that connect the adjacent diffraction action surfaces of the diffraction lens, wherein surface roughness of the step transfer surfaces is larger than surface roughness of the diffraction action transfer surfaces.

11 Claims, 20 Drawing Sheets

FIG. 15
(A) 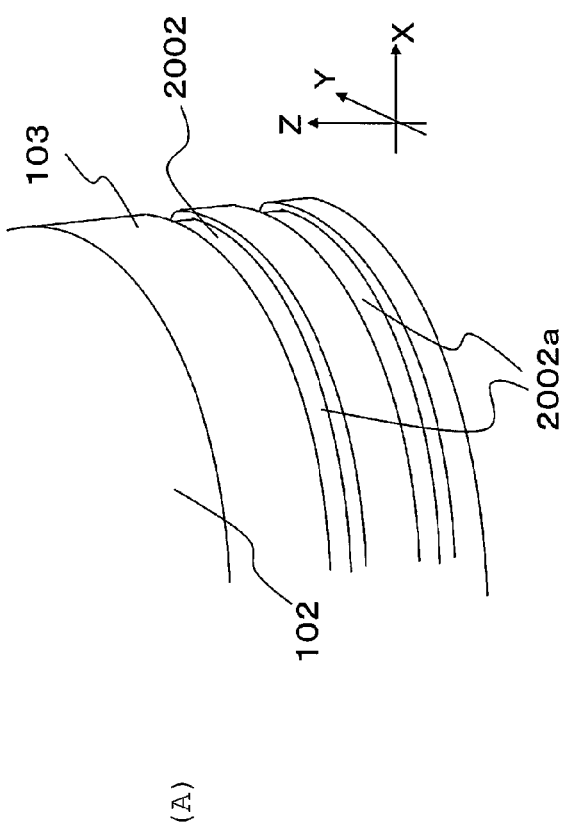
(B) 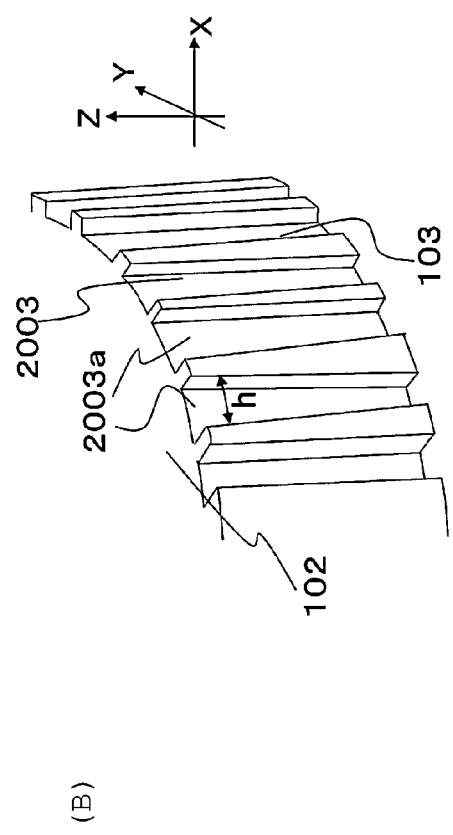

PRESSING MOLD FOR OPTICAL LENSES AND METHOD FOR MANUFACTURING GLASS OPTICAL LENSES

BACKGROUND OF THE INVENTION

1. Field of the Invention

The present invention relates to a pressing mold for optical lenses, a glass optical lens, a method for manufacturing glass optical lenses and the like.

2. Related art of the Invention

Conventionally, in order to manufacture a fine optical element with high accuracy, methods by processing resin directly or forming, since the processes are easy, have been adopted (see Japanese Patent Application Laid-Open (kokai) No. S54-110857 and Japanese Patent Publication (kokoku) No. S60-025761, for example).

However, such a fine optical element made of resin has a disadvantage that the accuracy tends to degrade since the shape is deformed because the volume of the resin changes due to environmental changes in temperature, humidity and the like. In addition, since the strength of the resin is low, the element has a disadvantage that the surface is easily damaged. Thus a reliable fine optical element with extremely high accuracy, which is made of resin, has not been obtained.

In contrast, a fine optical element made of glass has high durability; the surface is not easily damaged, and the accuracy does not degrade due to environmental changes. A method for manufacturing glass fine optical elements, by performing directly dry etching of the glass to process patterned fine optical elements, has been proposed (see, Japanese Patent Application Laid-Open (kokai) No. S55-057807, for example).

Such a method of processing glass by dry etching is capable of directly patterning the surface of the glass for the fine optical element, but has a disadvantage that, since it takes a lot of time to manufacture one element, many fine optical elements with the same pattern cannot be manufactured. Accordingly, by such methods, reliable glass fine optical elements with extremely high accuracy have not been mass-produced.

On the other hand, recently, methods for mass-producing optical glass elements (aspherical glass lenses, for example) by press molding of the glass have been proposed. When it becomes possible to produce glass optical lenses by repeated press molding of the glass, reliable fine optical elements with extremely high accuracy can be mass-produced. However, since high quality is required for a glass optical lens to produce image formation, in order to manufacture glass optical lenses by press molding, a pressing mold for high-accuracy glass optical lenses, which has extremely high strength and durability, is needed.

Materials of such molds are required to be excellent in heat shock resistance for molding performed repeatedly, and in processability for ultra-precise process; the materials are required to be chemically inactive with the glass even at higher temperature; the portion, which is to be a surface for forming the glass, has to be sufficiently hard and is not allowed to be easily damaged by friction and the like; the forming surface has to be free from plastic deformation and grain growth due to the molding at higher temperature.

As a mold material satisfying these necessary conditions to some extent, SiC material (see, Japanese Patent Application Laid-Open (kokai) No. S52-045613, for example) is proposed. Also, a mold having a cemented carbide mother material coated with a platinum group alloy thin film (see, Japanese Patent Application Laid-Open (kokai) No. S60-246230, for example) is proposed.

For press molding, a carbon-system thin film (a DLC film, for example) or a platinum-system alloy thin film is formed by sputtering on the patterned surface of such a mold with SiC material or cemented carbide material so that the demoldability of the glass may be improved.

SUMMARY OF THE INVENTION

However, when a glass optical lens is manufactured by press molding, the glass material to be softened is heated to the glass-transition temperature or higher. Then, at the time of pressing, a fine-shape portion such as the step portion of the diffraction shape possibly bites the glass material, and a tensile stress may be generated on the glass material at the time of demolding. Such tensile stresses generated will degrade the function of a lens, because a lens-shaped surface is distorted and aberrations and the like, which can not be generated from the designed shape of the lens, are caused. Further, if the level of biting is considerable, the glass material can not be demolded and will adhere to the mold. Consequently, there arises a problem that the lens is of little use and, since the glass adhered to the mold has to be forcibly eliminated, the mold life is also shortened.

In consideration of the problems of the aforementioned conventional pressing mold for optical lenses, an object of the present invention is to provide a pressing mold for optical lenses, a glass optical lens and a method for manufacturing glass optical lenses, which are capable of reducing the stress generated on the lens material at the time of demolding to prevent the glass from adhering.

In order to achieve the aforementioned object, the $1^{st}$ aspect of the present invention is a pressing mold for optical lenses, which molds a ring-zone-type diffraction lens having a plurality of concentric ring zones, the mold comprising:

diffraction action transfer surfaces configured to form diffraction action surfaces that diffract light passing through the diffraction lens; and step transfer surfaces configured to form step surfaces that connect the adjacent diffraction action surfaces of the diffraction lens, wherein surface roughness of the step transfer surfaces is larger than surface roughness of the diffraction action transfer surfaces.

The $2^{nd}$ aspect of the present invention is the pressing mold for optical lenses according to the $1^{st}$ aspect of the present invention, wherein the surface roughness Ra1 of the diffraction action transfer surfaces and the surface roughness Ra2 of the step transfer surfaces satisfy $$Ra1 < 10\ nm, \qquad \text{(Expression 1)}$$

and $$10\ nm < Ra2 < 200\ nm. \qquad \text{(Expression 2)}$$

The $3^{rd}$ aspect of the present invention is the pressing mold for optical lenses according to the $2^{nd}$ aspect of the present invention, wherein Ra2 satisfies, (i) when press molding is performed under inert gas atmosphere, $$10\ nm < Ra2 < 200\ nm, \qquad \text{(Expression 2)}$$

and (ii) when press molding is performed under vacuum atmosphere, $$10\ nm < Ra2 < 100\ nm. \qquad \text{(Expression 3)}$$

The 4th aspect of the present invention is the pressing mold for optical lenses according to the 1st aspect of the present invention, wherein fine grooves are formed on the step transfer surfaces, and
a direction of the fine groove is a direction of a rotation axis of the concentric ring zone.

The 5th aspect of the present invention is the pressing mold for optical lenses according to the 4th aspect of the present invention, wherein at least in a cross section including the rotation axis of the concentric ring zone, the step transfer surface is inclined by θ1 from one axis parallel to the rotation axis such that $$0°\leq θ1<10°$$ (Expression 4)

is satisfied, and the fine groove is formed to be parallel to another axis inclined by θ1 from one axis parallel to the rotation axis.

The 6th aspect of the present invention is the pressing mold for optical lenses according to the 4th aspect of the present invention, wherein the fine groove is shaped like at least one of a rectangular groove, a V-groove and a cylindrical groove.

The 7th aspect of the present invention is the pressing mold for optical lenses according to the 1st aspect of the present invention, wherein a pitch of the diffraction action transfer surface becomes larger toward a center of rotation axis of the concentric ring zone.

The 8th aspect of the present invention is the pressing mold for optical lenses according to the 1st aspect of the present invention, wherein mold material is at least one of cemented carbide mainly containing tungsten carbide (WC), titanium carbide (TiC), silicon carbide (SiC), and glassy carbon (GC).

The 9th aspect of the present invention is the pressing mold for optical lenses according to any one of the 1st to 8th aspects of the present invention, wherein the diffraction action transfer surfaces and the step transfer surfaces are surfaces of amorphous alloy films formed on mold materials,
the amorphous alloy films are alloy films containing at least one of platinum (Pt), rhodium (Rh), iridium (Ir), ruthenium (Ru), rhenium (Re), tungsten (W), tantalum (Ta), carbon (C) and Osmium (Os), and
surface roughness Ra3 of portions of the mold material corresponding to the step transfer surfaces satisfies $$200\ nm \leq Ra3 < 400\ nm.$$ (Expression 5)

The 10th aspect of the present invention is the pressing mold for optical lenses according to any one of the 1st to 8th aspects of the present invention, wherein the diffraction action transfer surfaces and the step transfer surfaces are surfaces of mold materials.

The 11th aspect of the present invention is a glass optical lens, on at least one surface of which a ring-zone-type diffraction lens structure having a plurality of concentric ring zones is formed, wherein the diffraction lens structure comprises diffraction action surfaces that diffract light passing through, and step surfaces that connect the adjacent diffraction action surfaces, and
surface roughness of the step surfaces is larger than surface roughness of the diffraction action surfaces.

The 12th aspect of the present invention is the glass optical lens according to the 11th aspect of the present invention, wherein fine grooves are formed on the step surfaces, and
a direction of the fine groove is a direction of a rotation axis of the concentric ring zone.

The 13th aspect of the present invention is a method for manufacturing glass optical lenses, using the pressing mold for optical lenses according to the 1st aspect of the present invention, the method comprising:

a heating step of heating glass material, which is to be softened, to a glass-transition temperature or higher;
a pressing step of pressing the softened glass material; and
a demolding step of demolding, after the pressing step, the glass material cooled to the glass-transition temperature or lower, from the pressing mold for optical lenses.

The 14th aspect of the present invention is the method for manufacturing glass optical lenses according to the 13th aspect of the present invention, wherein an upper limit value of surface roughness Ra2 of the step transfer surfaces, which is allowed in a case where the pressing step is performed under inert gas atmosphere, is larger than an upper limit value of Ra2, which is allowed in a case where the pressing step is performed under vacuum atmosphere.

According to the present invention, it is possible to provide a pressing mold for optical lenses, a glass optical lens and a method for manufacturing glass optical lenses, which are capable of reducing the stress generated on the lens material at the time of demolding to prevent the glass from adhering.

BRIEF DESCRIPTION OF THE DRAWINGS

FIGS. 15(A) and (B) are views showing examples of variation of the fine shapes according to the first and second embodiments of the present invention;

Figure 1:
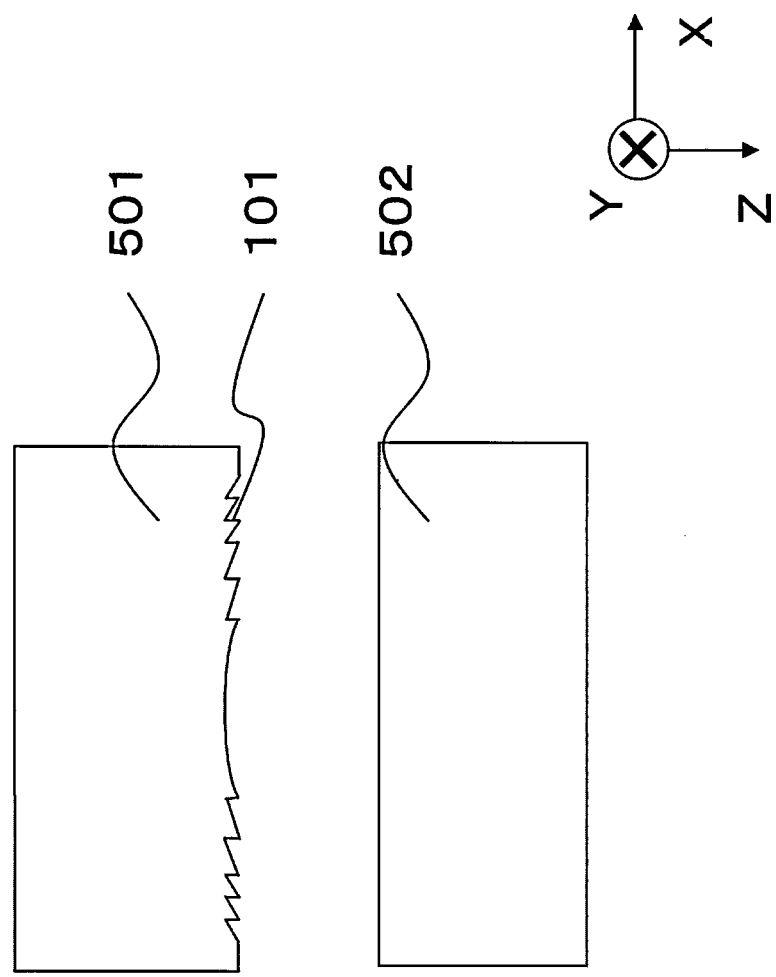
FIG. 1 is a configuration view of a front surface of a pressing mold for optical lenses according to a first embodiment of the present invention.

DESCRIPTION OF SYMBOLS 101 diffraction shape transfer portion
102 diffraction action transfer surface
103 step transfer surface
104 flat portion
201 fine shape
301 glass material
302, 303 demolding film
501 forming mold
502 flat mold
601 glass optical lens

PREFERRED EMBODIMENTS OF THE INVENTION

In the following, embodiments of the present invention will be described by reference to FIGS. 1 to 20.

First Embodiment

FIG. 1 is a front view of the pressing mold for optical lenses according to the first embodiment of the present invention. As shown in FIG. 1, the pressing mold for optical lenses according to the first embodiment includes a forming mold 501 as an upper mold, and a flat mold 502 as a lower mold. A diffraction shape transfer portion 101 which forms a diffraction shape on lenses is provided on the bottom surface of the forming mold 501. Each axis is set, assuming an X axis to be directed toward the right side of the paper (the right side is plus and the left side is minus), a Y axis to be directed perpendicular to the paper (the rear side of the paper is plus and the front side of the paper is minus), and a Z axis to be directed toward the lower side of the paper (the lower side is plus and the upper side is minus).

Figure 2:
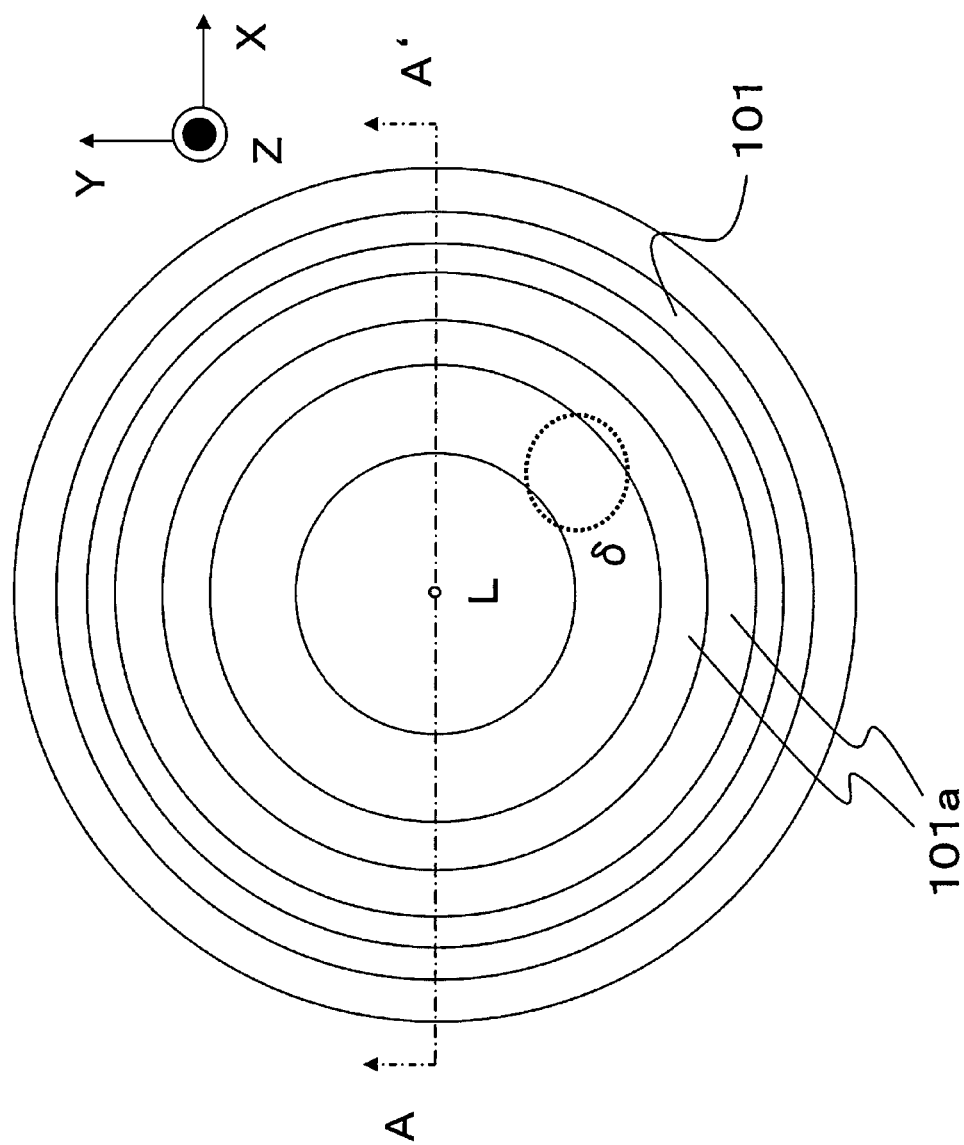
FIG. 2 is a bottom view of a forming mold according to the first embodiment of the present invention.
Figure 3:
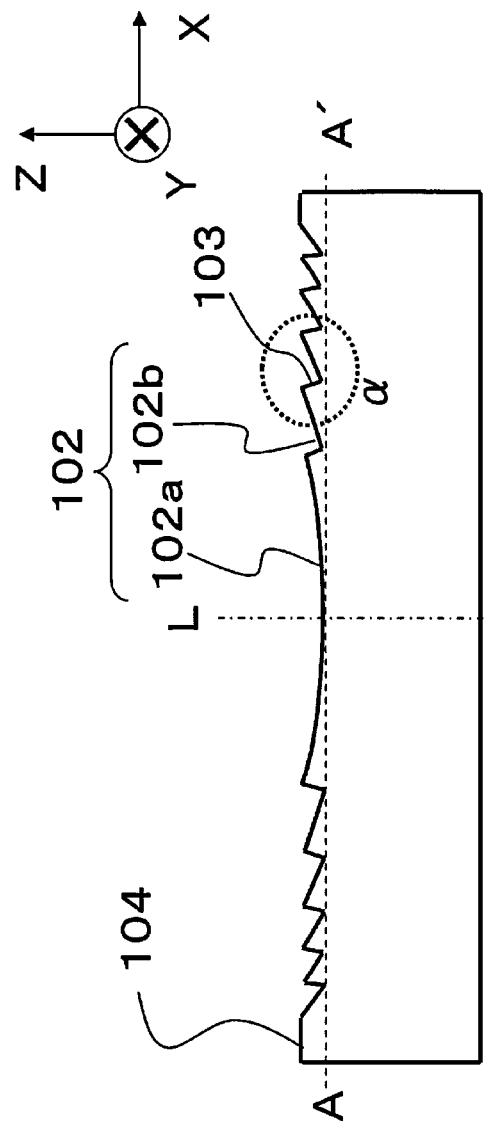
FIG. 3 is a sectional configuration view taken along A-A' in FIG. 2.
Figure 4:
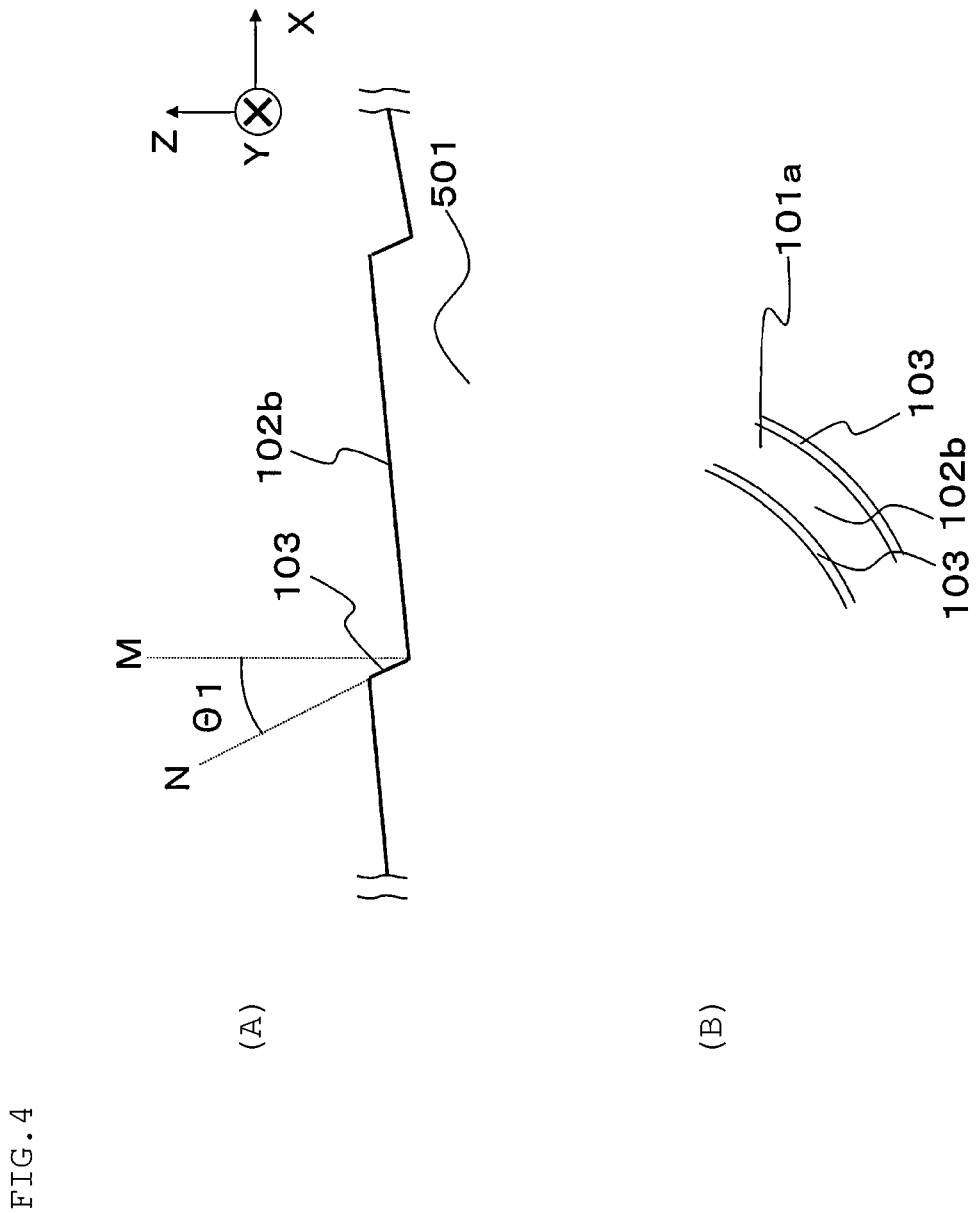
FIG. 4(A) is an enlarged sectional configuration view of a region a in FIG. 3.
FIG. 4(B) is an enlarged view of a region δ in FIG. 2.

FIG. 2 is a configuration view of the bottom surface of the forming mold 501 according to the embodiment of the present invention. The bottom view is a view from the plus side of the Z axis. FIG. 3 is the sectional configuration view taken along A-A' in FIG. 2.

As shown in the drawings, the diffraction shape transfer portion 101 has a plurality of concentric ring zones 101a around an axis L. A diffraction action transfer surface 102 which forms a diffraction action surface to diffract light passing through a lens molded by the mold is formed on the diffraction shape transfer portion 101. The diffraction action transfer surface 102 includes a circular diffraction action transfer surface 102a which is shaped like a circle and is formed in the center of the concentric circles, and a plurality of ring-zone diffraction action transfer surfaces 102b, each of which is shaped like a ring-zone and is formed around the circular diffraction action transfer surface 102a. The ring zones 101a shown in FIG. 1 are formed by the ring-zone diffraction action transfer surfaces 102b.

A step transfer surface 103 which forms a step surface to connect adjacent diffraction action surfaces of the lens molded by the mold is also formed on the diffraction shape transfer portion 101. A flat portion 104 is further provided around the diffraction shape transfer portion 101. In FIGS. 2 and 3, reference character L denotes the rotation axis of the diffraction shape transfer portion 101.

FIG. 4(A) is an enlarged configuration view of the region α shown in FIG. 3. As shown in FIG. 4(A), the step transfer surface 103 is inclined toward the center of the concentric ring zones 101a (in the minus X direction in FIG. 4(A)) from an axis M parallel to the rotation axis L. When the inclination is represented as θ1, the inclination θ1 satisfies the following (Expression 4).

$$0° \leq θ1 < 10°$$ (Expression 4)

Reference character N denotes the axis inclined by θ1 toward the center from the axis M. The inclination will be further described at the time of describing a method for manufacturing a glass optical lens.

FIG. 4(B) is an enlarged view of a δ portion in FIG. 2. Although the step transfer surfaces 103 are not shown in FIG. 2, the step transfer surfaces 103 are visually recognized from the plus side of the Z axis as shown in FIG. 4(B) when θ1 is larger than 0°.

Figure 5:
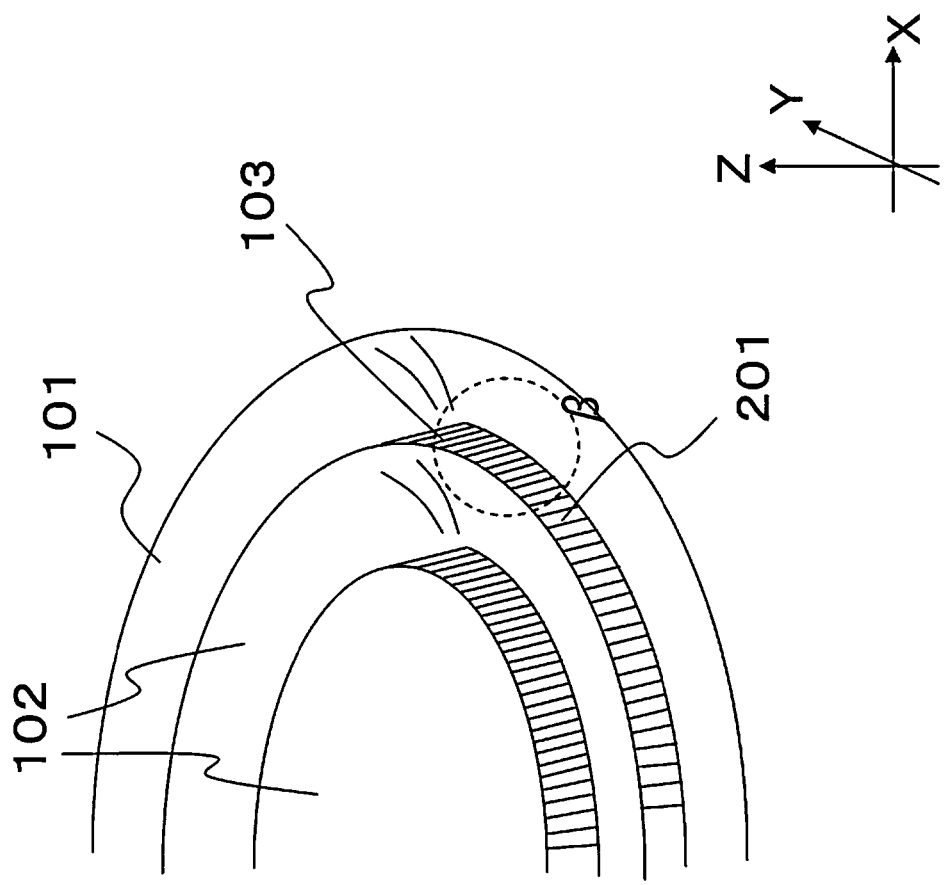
FIG. 5 is an enlarged perspective conceptual view of the region a in FIG. 3.

FIG. 5 is the enlarged perspective conceptual view of the region α shown in FIG. 3.

As shown in FIG. 5, a fine shape 201 with fine uneven structure is formed on the step transfer surface 103.

Meanwhile, the diffraction action transfer surface 102 needs to have a function of diffracting the light transmitted through the molded lens, and the efficiency of transmitted light (light transmittance) is important as the lens. As for the surface accuracy of the diffraction action transfer surface 102, when the surface roughness is defined as Ra1, the surface accuracy of the forming mold 501 is set so as to satisfy the following (Expression 1) in order to set the light transmittance of the lens molded by the mold to 90% or more.

$$Ra1 < 10 \text{ nm}$$ (Expression 1)

The surface roughness of the step transfer surface 103 which forms the step surface to connect the adjacent diffraction action surfaces of the lens molded by the mold is defined as Ra2. The surface roughness Ra2 of the step transfer surface 103 is set so as to satisfy the following (Expression 2).

$$10 \text{ nm} < Ra2 < 200 \text{ nm}$$ (Expression 2)

The fine shape 201 is formed on the step transfer surface 103 such that the surface roughness Ra2 satisfies the (Expression 2).

Figure 6:
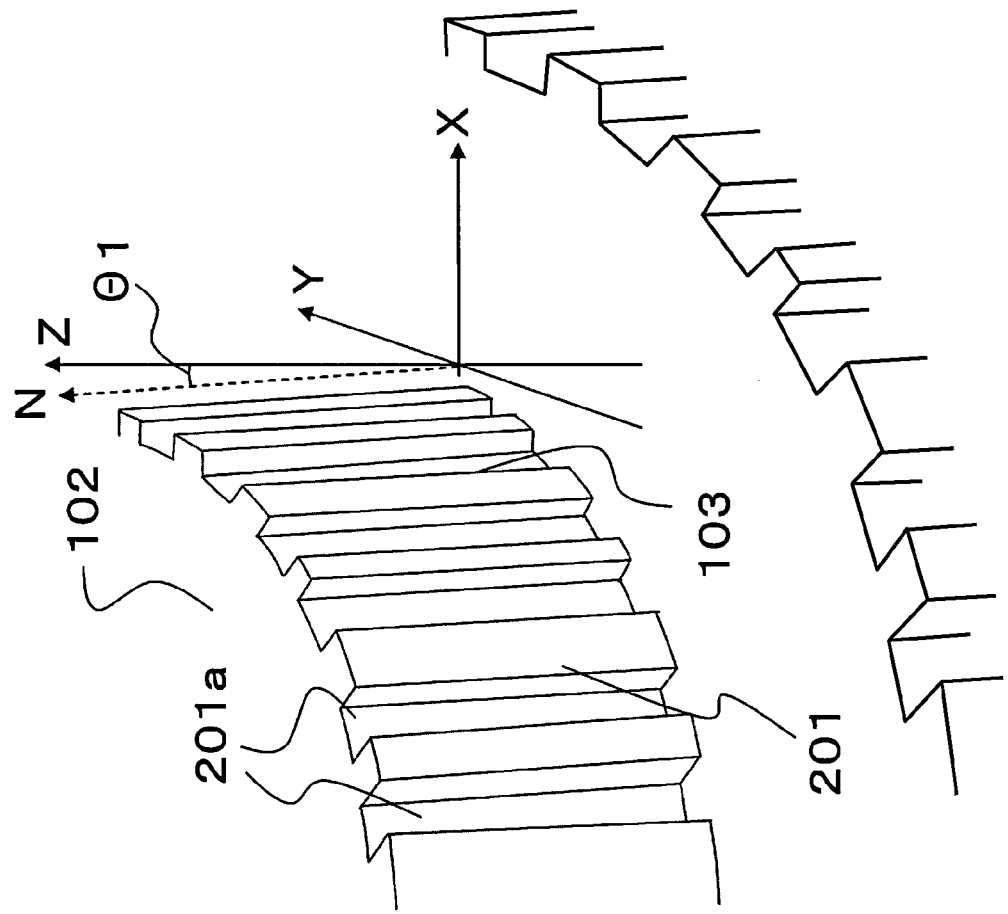
FIG. 6 is an enlarged conceptual view of a region β in FIG. 5.

FIG. 6 is the enlarged conceptual view of the region β shown in FIG. 5. As shown in FIG. 6, a plurality of fine shapes 201 are formed on the step transfer surface 103. A plurality of grooves, each of which has a rectangular section, are disposed in parallel to constitute the fine shapes 201. Each of the rectangular grooves 201a is formed substantially parallel to the inclined direction of the step transfer surface 103 (the axis N inclined by θ1 from the axis M shown in FIG. 4). The rectangular grooves 201a formed substantially parallel to the axis N are formed by bringing a tool into vibrating contact with the step transfer surface 103 and thereby machining the step transfer surface 103. The fine shapes 201 in FIG. 6 are shown in a greatly enlarged manner as compared to the actual size in order to simply show the structure. The effect obtained by the fine shapes 201 will be described by reference to FIG. 9.

FIG. 7(A) is a front conceptual view of the forming mold 501. Reference character P in FIG. 7(A) denotes the width of the ring zone 101a. FIG. 7(B) is an enlarged view of a γ portion in FIG. 7(A). Reference character S in FIG. 7(B) denotes a border portion between the diffraction action transfer surface 102 and the step transfer surface 103 from the center to the end of the ring zones. An interval between S and S corresponds to P.

This P is set to be largest at a position closest to the rotation center of the ring zones, and to become smaller toward the outer periphery. The configuration is one of examples of a pitch of a diffraction action transfer surface in the present invention.

The diffraction action transfer surface 102 and the step transfer surface 103 according to the present embodiment are one of examples of a diffraction action transfer surface and a step transfer surface as the surface of a mold material in the present invention. The rectangular groove 201a according to the first embodiment is one of examples of a fine groove in the present invention.

Next, the method for manufacturing a glass optical lens according to the first embodiment of the present invention will be described.

First, processes for manufacturing a glass optical lens will be schematically described by reference to FIGS. 8(A) to (C).

FIGS. 8(A) to (C) are views for explaining the processes for manufacturing a glass optical lens by pressing a glass material by using the forming mold 501 having the diffraction shape transfer portion 101, and the flat mold 502.

First, a heating process of heating a glass material 301 to the glass-transition temperature or higher and thereby softening the glass material 301 is performed as shown in FIG. 8(A). Subsequently, a pressing process of moving the forming mold 501 in the plus direction of the Z axis and thereby pressing the softened glass material 301 to transfer the shapes of the diffraction shape transfer portion 101 and the flat portion 104 onto the glass material 301 is performed as shown in FIG. 8(B). After the pressing process, a demolding process of cooling the glass material 301 to the glass-transition temperature or lower, and demolding a glass optical lens 601 formed by transferring the diffraction shape and the flat shape onto the glass material 301 from the forming mold 501 is performed as shown in FIG. 8(C). The heating, pressing and demolding processes are performed at a normal pressure under inert gas, such as a nitrogen gas, atmosphere.

The mold material of the forming mold 501 and the flat mold 502 is selected from cemented carbide mainly containing tungsten carbide (WC), titanium carbide (TiC), silicon carbide (SiC), and glassy carbon (GC) having a vickers hardness (Hv) of 400 or more at a high temperature of 450 degrees or higher since the molds need to withstand a pressure at a high temperature. Any material having a Hv of 400 or more at a high temperature of 450 degrees or higher may be also selected as the mold material in addition to the aforementioned materials.

Next, the action of the step transfer surface 103 on the glass material 301 in the method for manufacturing the glass optical lens will be described.

FIGS. 9(A) to (C) are conceptual views for explaining the state of the step transfer surface 103 and the glass material 301 in the heating, pressing and demolding processes. FIGS. 9(A) to (C) are conceptual views of the step transfer surface 103 shown in FIG. 6 as viewed from the plus direction of the Z axis. Only a portion of the glass material 301 arranged on the step transfer surface 103 is shown in the drawings. As described above, the heating, pressing and demolding processes are performed in the nitrogen gas that is an inert gas.

In the heating process in FIG. 9(A), the glass material 301 is heated to the glass-transition temperature or higher. In the pressing process in FIG. 9(B), a pressure is applied to the softened glass material 301, and the glass material 301 is thereby pressed against the step transfer surface 103. The shape of the step transfer surface 103 is transferred on the glass material 301, so that the step surface is formed on the glass material 301. The size of the fine shape 201 is adjusted such that the surface roughness Ra2 of the step transfer surface 103 satisfies the (Expression 2) as described above.

$$10 \text{ nm} < Ra2 \text{ (Inert gas)} < 200 \text{ nm} \quad \text{(Expression 2)}$$

Because the step transfer surface 103 has the surface roughness Ra2, the nitrogen gas is filled in the fine groove portions of the fine shapes 201, and the glass material 301 thus does not enter the fine shapes 201 during the pressurization transfer. Accordingly, in the present embodiment, a stress generated between the glass material 301 and the step transfer surface 103 is reduced, since a contact area between the glass material 301 and the step transfer surface 103 is smaller, compared to a case where no fine shape 201 is provided.

The demoldability of the glass material 301 from the forming mold 501 is thereby improved, and glass can be prevented from adhering to the mold in the demolding process shown in FIG. 9(C). In a case where Ra2 is 10 nm or less, the step transfer surface 103 is an optical mirror surface. Thus, the effect that the contact area becomes smaller is reduced. Also, in a case where Ra2 is 200 nm or more, the glass material enters the groove portions, so that the contact area becomes larger. Thus, the effect that the demoldability is improved is reduced.

The glass optical lens 601 according to the first embodiment can be manufactured through the aforementioned processes.

Figure 10:
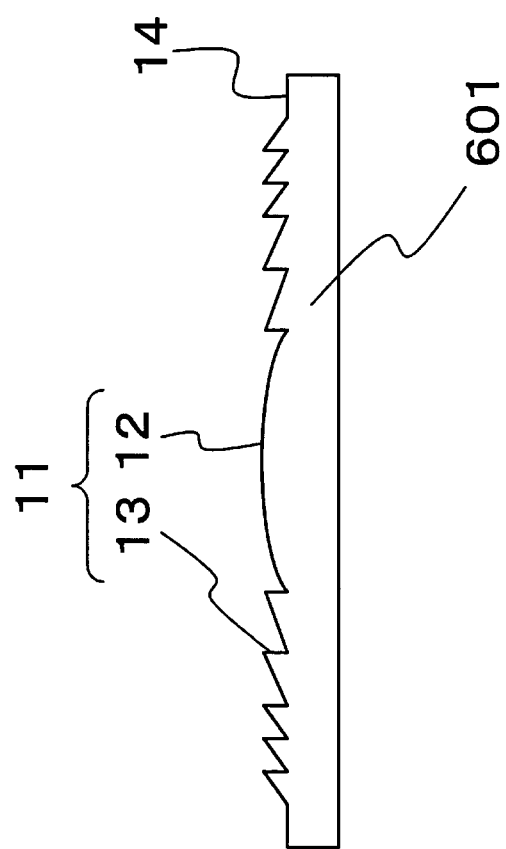
FIG. 10 is a front view of the glass optical lens according to the first embodiment of the present invention.

FIG. 10 is a front view of the glass optical lens 601 according to the first embodiment. A diffraction shape portion 11 having a diffraction action surface 12 and a step surfaces 13 provided between the adjacent diffraction action surfaces 12 is formed on the upper surface of the glass optical lens 601 through the aforementioned processes. A flat portion 14 is also formed around the diffraction shape portion 11. The glass optical lens 601 is one of examples of a diffractive lens in the present invention.

As described above, in the present embodiment, the stress generated on the glass material can be reduced, and the glass material can be prevented from adhering to the mold in the demolding process.

Figure 11:
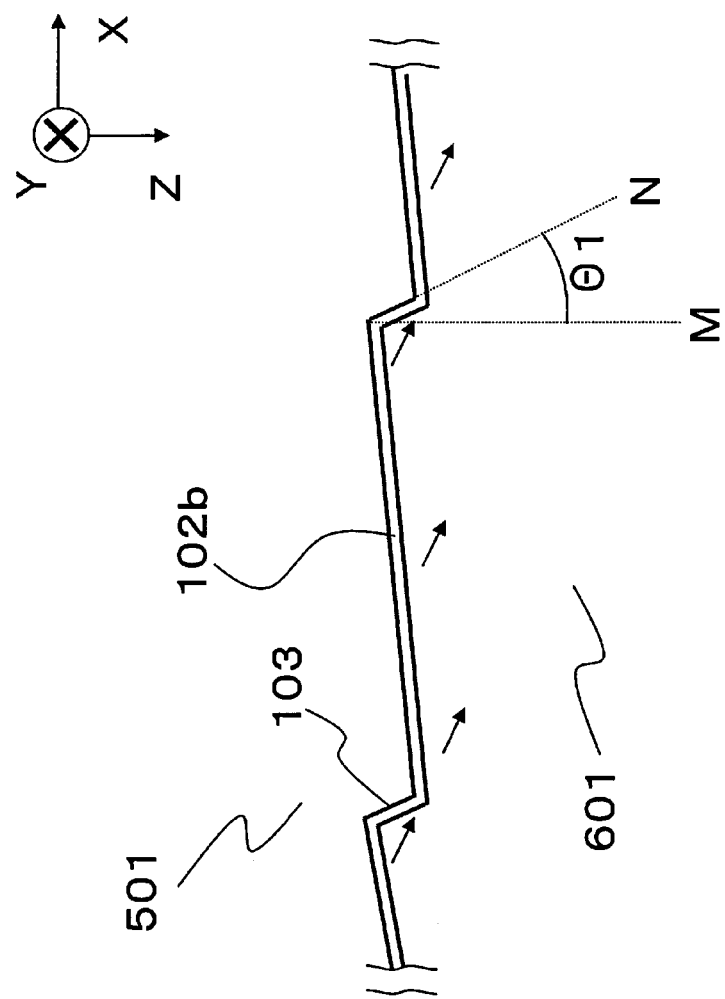
FIG. 11 is a view for explaining the relationship between the forming mold and a lens material in the method for manufacturing the glass optical lens according to the first embodiment of the present invention.

FIG. 11 is a conceptual view when the ring-zone diffraction action transfer surface 102b, the step transfer surface 103 and the glass optical lens 601 are cooled. When heated, the glass material 301 expands with the thermal expansion coefficient of the material. The glass material 301 is cooled after the pressing process in the expansion state. Thus, the glass material 301, which is in close contact with the diffraction shape transfer portion 101 (FIG. 1) of the forming mold 501, contracts. The glass material 301 contracts toward the center of the glass optical lens 601. Arrows in FIG. 11 indicate the contraction direction.

When the glass material 301 contracts, a force acts in a direction to press the glass material 301 against the step transfer surface 103, so that the wringing force increases. By forming the fine shapes 201 on the step transfer surface 103, the demoldability is improved due to the decrease in contact area as described by reference to FIG. 9. The force causing the glass to adhere to the step transfer surface 103 can be thereby reduced at the time of demolding the glass optical lens 601 from the forming mold 501.

In the present embodiment, the grooves are formed parallel to the inclined surface of the step transfer surface 103 (the axis N in FIG. 6) in the fine shapes 201 as shown in FIG. 6. The axis N is inclined from the Z axis by up to 10° only. Thus, the force acting on the step transfer surface 103 when the glass optical lens 601 is demolded from the forming mold 501 is substantially parallel to the groove direction. Even when the glass material 301 enters a portion of the grooves of the fine shapes 201, a contact force between the fine shapes 201 and the glass optical lens 601 can be reduced.

Next, θ1 shown in the (Expression 4) will be described. When θ1 has a minus value (in the plus X direction in FIG. 4), the glass optical lens 601 interferes with the step transfer surface 103 when demolded from the forming mold 501, and the shape of the diffraction shape transfer portion 101 cannot be accurately transferred thereon. Thus, θ1 is preferably at least 0°.

When the step transfer surface 103 is formed inclined in the plus direction of the X axis, the ratio of the contraction force of the glass material 301, which acts on the step transfer surface 103, becomes smaller. The demoldability is thereby improved. If the inclined angle θ1 is further increased in the plus direction, the amount of light passing through a portion of the molded glass optical lens 601 where the shape of the diffraction action transfer surface 102 is transferred is reduced, thereby reducing the diffraction efficiency. Accordingly, the step transfer surface 103 is preferably formed by setting the inclined angle θ1 to be less than 10°.

Figure 7:
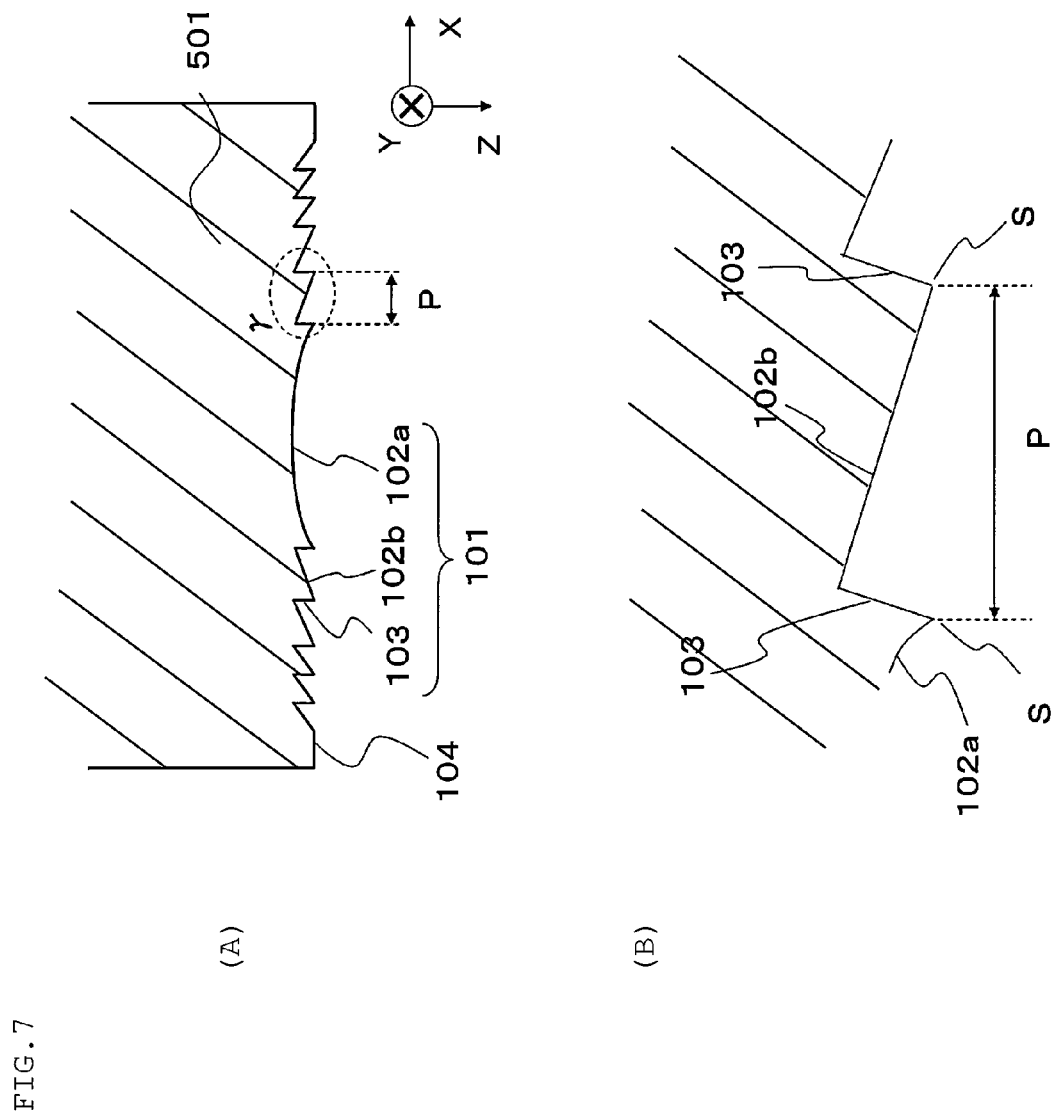
FIG. 7(A) is a front configuration view of the forming mold according to the first embodiment of the present invention.
FIG. 7(B) is an enlarged view of a region γ in FIG. 7(A)
Figure 8:
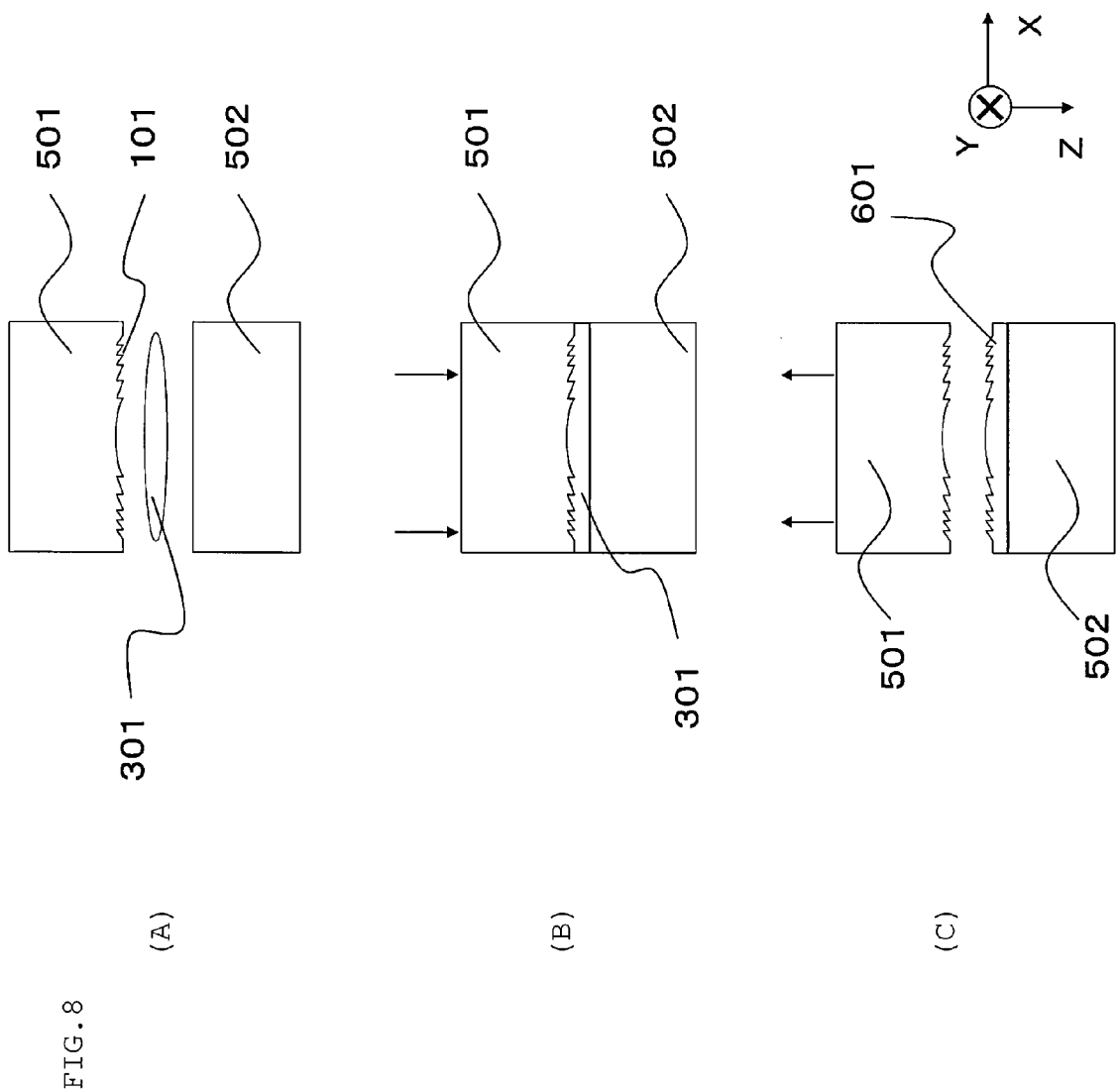
FIGS. 8(A) to (C) are views for explaining a method for manufacturing a glass optical lens according to the first embodiment of the present invention.
Figure 9:
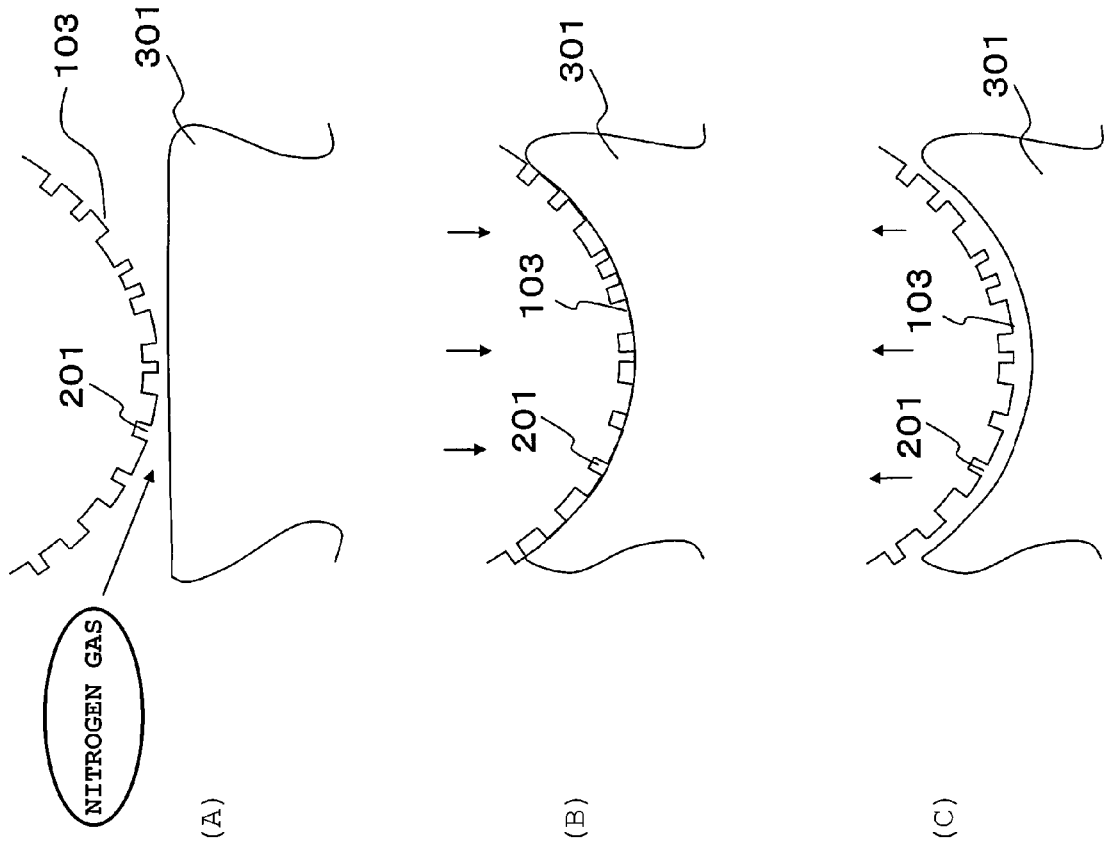
FIGS. 9(A) to (C) are views for explaining the state of a step transfer surface and a glass material in the method for manufacturing the glass optical lens according to the first embodiment of the present invention.

In the present embodiment, the diffraction shape transfer portion 101 is formed such that P becomes gradually smaller toward the outer periphery as described by reference to FIG. 7. When P becomes smaller toward the outer periphery, there are more diffraction ring zones in the outer peripheral portion. When there are more diffraction ring zones, the ratio of the step transfer surface 103 in the outer peripheral portion is increased. Thus, the demolding of the glass optical lens 601 from the shape of the diffraction shape transfer portion 101 starts from the outer peripheral portion in the demolding process after the shape of the diffraction shape transfer portion 101 of the forming mold 501 is transferred onto the glass optical lens 601. The shape transferability is thereby improved. Furthermore, when there are more diffraction ring zones in the outer peripheral portion of the molded lens, the lens is cooled from the outer periphery when the lens is molded. The demoldability can be thereby further improved.

Although the nitrogen gas is employed as an inert gas in the present embodiment, an inert gas such as an argon gas and a carbon dioxide gas may be also used. The aforementioned (Expression 2) is also satisfied even in the gas as described above.

Although the heating, pressing, and demolding processes are performed in the inert gas in the first embodiment, the sequential processes may be also performed under a vacuum. The vacuum is defined as a state in which a pressure in an atmosphere is $8 \times 10^{-1}$ Pa or less. The glass material 301 easily enters the fine shapes under vacuum atmosphere since the gas amount in the ambient atmosphere is small.

Thus, the surface roughness Ra2 of the fine shapes 201 under vacuum atmosphere is set to be smaller than that of the aforementioned case. To be more specific, the fine shapes 201 are formed such that the surface roughness Ra2 of the step transfer surface 103 satisfies (Expression 3).

$$10 \text{ nm} < Ra2 < 100 \text{ nm} \tag{Expression 3}$$

By forming the step transfer surface 103 as described above, the glass material 301 does not enter the fine shapes 201 during the pressurization transfer, so that the contact area between the glass material 301 and the step transfer surface 103 can be made smaller than that in a case where the fine shapes 201 are not formed. Accordingly, the stress generated between the glass material 301 and the step transfer surface 103 can be reduced, the demoldability is improved, and the glass material can be prevented from adhering in the demolding process.

Second Embodiment

Next, a pressing mold for optical lenses according to the second embodiment of the present invention will be described. The pressing mold for optical lenses according to the second embodiment has a fundamental structure similar to that described in the first embodiment, but is different from the pressing mold according to the first embodiment in that demolding films are formed on the surface of the forming mold and the flat mold. Accordingly, such differences are mainly described below.

Figure 12:
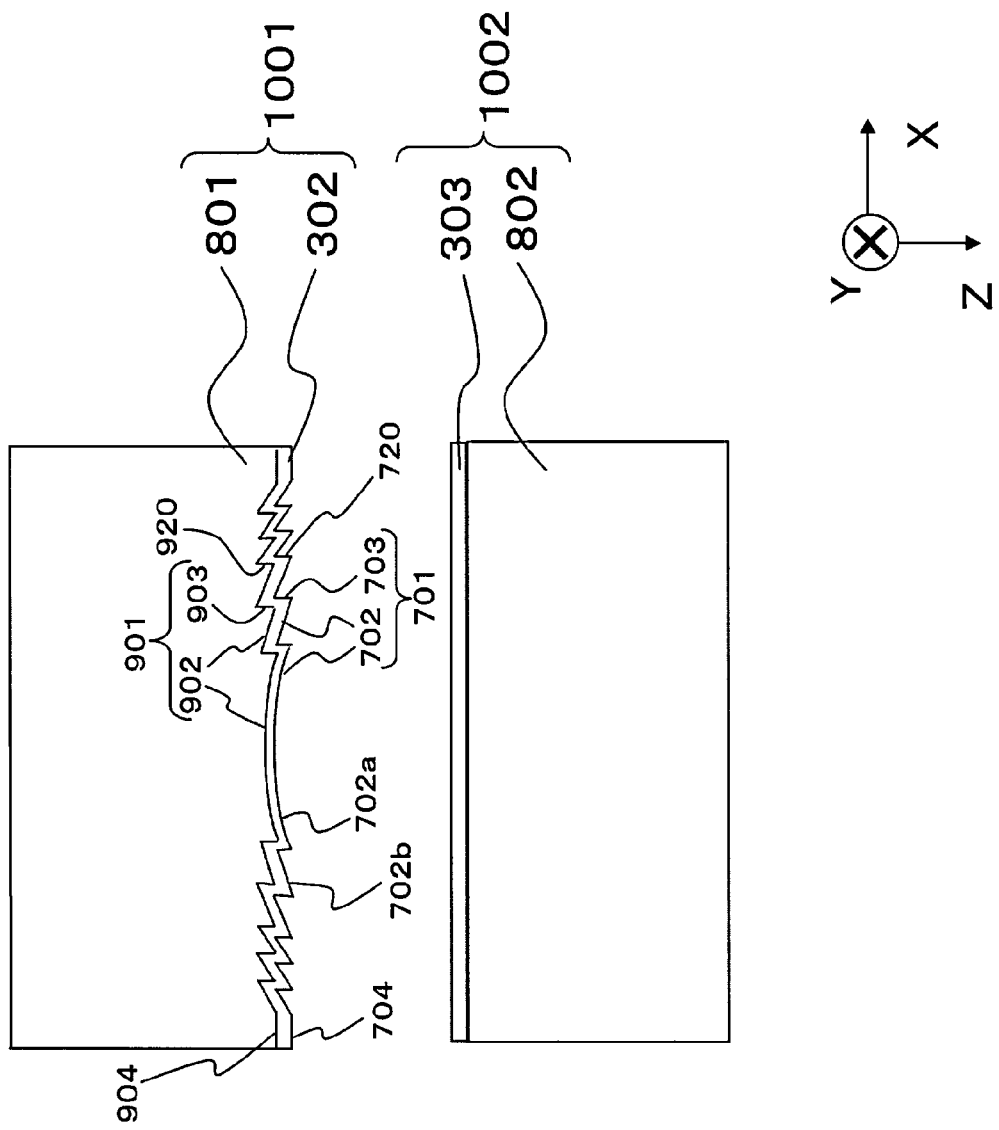
FIG. 12 is a configuration view of the front surface of a pressing mold for optical lenses according to a second embodiment of the present invention.
Figure 13:
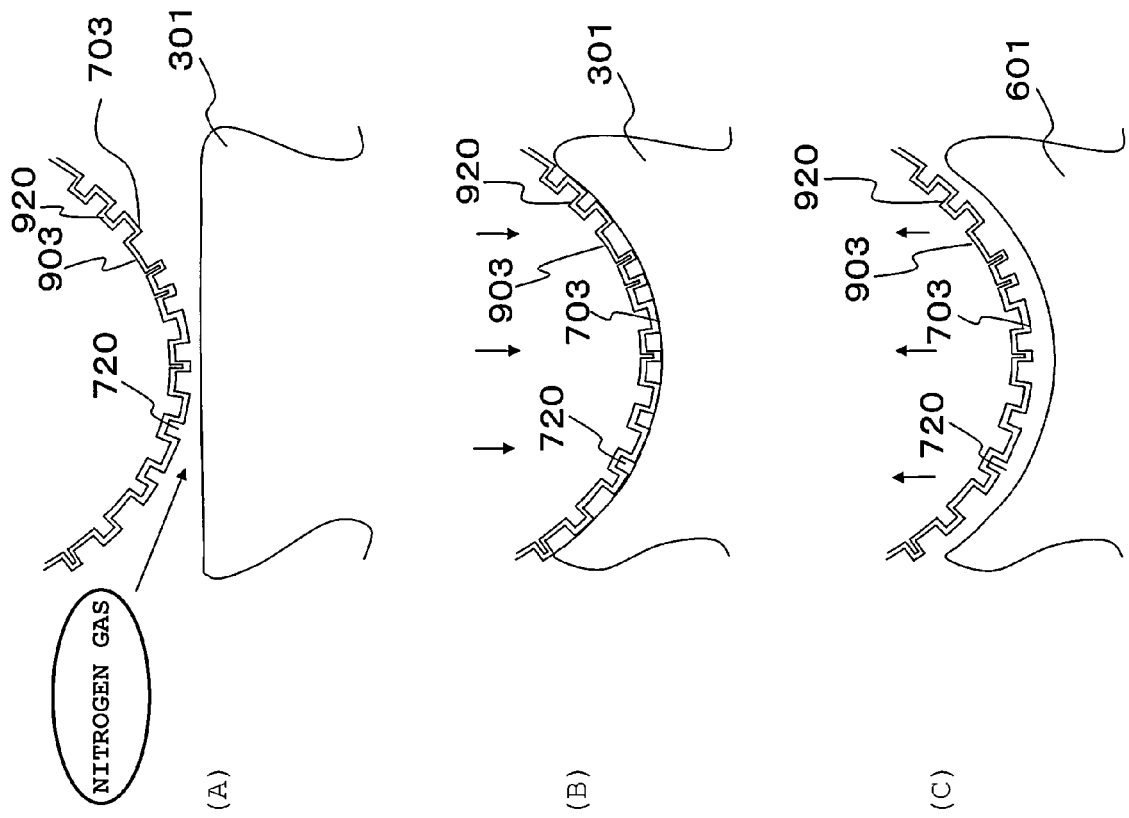
FIGS. 13(A) to (C) are views for explaining the state of the step transfer surface and the glass material in a method for manufacturing the glass optical lens according to the second embodiment of the present invention.
Figure 14:
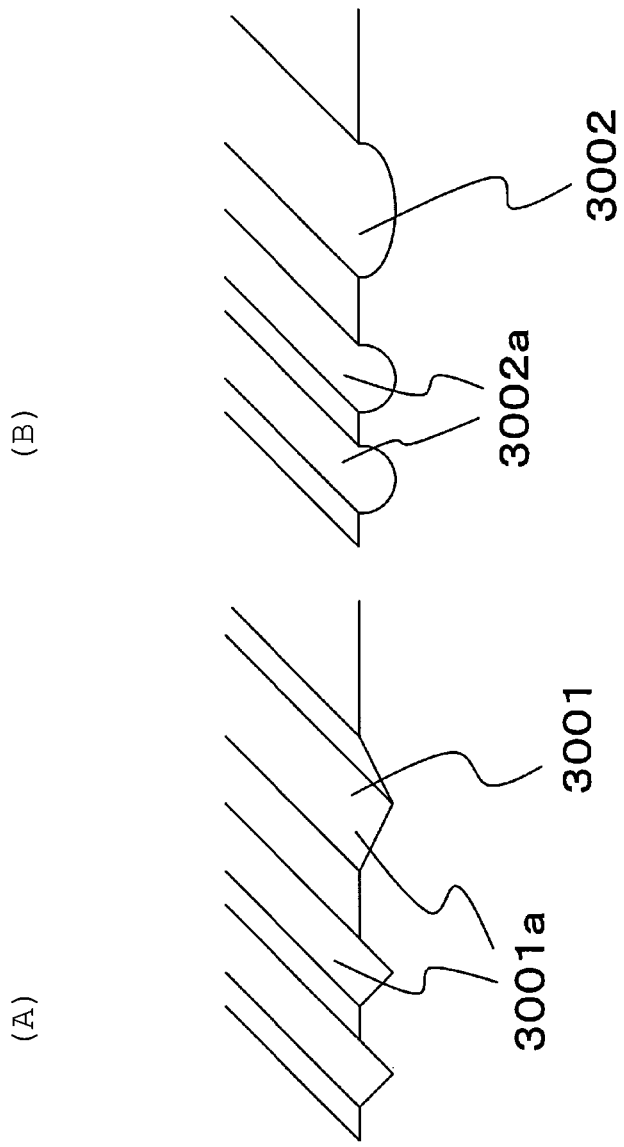
FIG. 14(A) is a view showing a fine shape having V-groove structure, which is an example of variation of fine shapes according to the first and second embodiments of the present invention.
FIG. 14(B) is a view showing a fine shape having cylindrical groove structure, which is an example of variation of the fine shapes according to the first and second embodiments of the present invention.

FIG. 12 is a configuration view of the front surface of the pressing mold for optical lenses according to the second embodiment. FIGS. 13(A) to (C) are views for describing the state of the step transfer surface and the glass material when the glass optical lens is manufactured. As shown in FIG. 12, the pressing mold for optical lenses according to the second embodiment has a demolding film 302 formed on the surface of a forming mold 1001 and a demolding film 303 formed on the surface of a flat mold 1002.

In the present embodiment, a diffraction shape transfer portion 701, a diffraction action transfer surface 702 and a step transfer surface 703, which are similar to those explained in the first embodiment, are formed on the surface portion of the demolding film 302. A flat portion 704 is further formed around the diffraction shape transfer portion 701. As is the case in the first embodiment, the diffraction action transfer surface 702 includes a circular diffraction action transfer surface 702a which is shaped like a circle and is formed in the center of the ring-zone, and ring-zone diffraction action transfer surfaces 702b, each of which is shaped like a ring-zone and is formed around its circumference.

A portion of the forming mold 1001 excluding the demolding film 302 is shown as a forming mold material 801 in the drawing. Further, a portion of the forming mold material 801 corresponding to the diffraction shape transfer portion 701 is shown as a diffraction shape transfer material portion 901, a surface of the forming mold material 801 corresponding to the diffraction action transfer surface 702 is shown as a diffraction action transfer material surface 902, and a surface of the forming mold material 801 corresponding to the step transfer surface 703 is shown as a step transfer material surface 903. In addition, a portion of the forming mold material 801 corresponding to the flat portion 704 is shown as a flat material portion 904.

Similarly, a portion of the flat mold 1002 excluding the demolding film 303 is shown as a flat mold material 802 in the drawing.

Any material having low reactivity with the glass material 301 is used as the material of the demolding film 302 and the demolding film 303; an amorphous alloy film is formed with an alloy film, which is formed by vapor deposition method, sputtering method, and like methods, containing at least one of platinum (Pt), rhodium (Rh), iridium (Ir), ruthenium (Ru), rhenium (Re), tungsten (W), tantalum (Ta), carbon (C), and Osmium (Os).

The diffraction action transfer surface 702 on the demolding film 302 according to the present embodiment is one of examples of a diffraction action transfer surface in the present invention. The step transfer surface 703 on the demolding film 302 according to the present embodiment is one of examples of a step transfer surface in the present invention. The demolding film 302 according to the present embodiment is one of examples of an amorphous alloy film in the present invention. The step transfer material surface 903 according to the present embodiment is one of examples of a portion of a mold material that forms a step transfer surface in the present invention.

When a demolding film is formed, a film thickness is set. If the film thickness of the demolding film 302 is too large, the demolding film 302 may not be formed with uniform thickness all over the mold surface, and hence deviation from the designed shape of the mold tends to be large. Thus the thickness of the demolding film 302 is set to be 2 μm or less.

Since it is desirable for the demolding film 302 to be in more close contact with the step transfer material surface 903, in forming the demolding film 302, when the surface roughness of the step transfer material surface 903 is defined as Ra3, a fine shape 920 is formed such that Ra3 satisfies the following (Expression 5).

$$200 \text{ nm} \leq Ra3 < 400 \text{ nm} \quad \text{(Expression 5)}$$

In such a case where Ra3 is 200 nm or more, the demolding film 302 enters the fine shapes 920 of the step transfer material surface 903, so that a contact area between the step transfer material surface 903 and the demolding film 302 becomes larger to improve a level of contact. As is the case in the fine shapes 201 described in the first embodiment, the fine shapes 920 formed on the step transfer material surface 903 are constituted of a plurality of grooves, each of which has a rectangular section.

The demolding film 302 is formed on the material surface of the forming mold material 801 formed in this way. To improve the demoldability, the demolding film 302 is formed by forming the fine shapes 720 on the step transfer surface 703 on the demolding film 302 so that the glass material 301 will not enter the fine shapes 720. When its formation is performed under inert gas atmosphere, the surface roughness Ra2 of the step transfer surface 703 of the demolding film 302, which is a surface the glass material 301 contacts, satisfies the (Expression 2) described in the first embodiment. As is the case in the fine shapes 201 described in the first embodiment, the fine shapes 720 are also constituted of a plurality of grooves, each of which has a rectangular section.

$$10 \text{ nm} < Ra2 < 200 \text{ nm} \quad \text{(Expression 2)}$$

As described above, in the second embodiment, by setting the surface roughness of the step transfer surface 703 of the demolding film 302 provided on the forming mold material 801 to be in a range similar to that in the first embodiment, the stress generated on the glass material can be reduced in the demolding process, the demoldability is improved, and the glass material can be prevented from adhering to the mold. Also, when the demolding film 302 is formed on the step transfer material surface 903, on which the fine shapes are formed so as to satisfy the aforementioned (Expression 5), the step transfer surface 703 satisfying the aforementioned (Expression 2) can be formed if the thickness of the film is adjusted by adjusting sputtering time, for example.

Furthermore, in a case where the inert gas atmosphere is replaced with the vacuum atmosphere, the fine shapes 720 are formed such that the surface roughness Ra2 of the step transfer surface 703 formed on the demolding film 302 satisfies the (Expression 3).

$$10 \text{ nm} < Ra2 \text{ (vacuum)} < 100 \text{ nm} \quad \text{(Expression 3)}$$

Also, in this case, as explained above, the step transfer surface 703 satisfying the aforementioned (Expression 3) can be formed if the thickness of the demolding film 302 formed on the step transfer material surface 903, on which the fine shapes are formed, is adjusted by adjusting sputtering time, for example.

Moreover, since the maximum film thickness is 2 μm, the aforementioned Ra1 is set to be 400 nm or less so that the fine shapes 720 satisfies the condition of the (Expression 2).

As described above, to improve the demoldability of the glass material 301, the above-described demolding film may be formed on the forming mold 501. Of course, its formation may be performed under inert gas or vacuum atmosphere. Whether such a demolding film is formed or not, the important thing is that the surface roughness of the step transfer surface, which contacts the glass material 301, is set to satisfy the (Expression 2) or the (Expression 3).

Moreover, in the aforementioned embodiments, the diffraction action transfer surface 102 or 702 and the step transfer surface 103 or 703 are formed such that the surface roughness Ra1 and Ra2 satisfy the (Expression 1) and the (Expression 2), respectively. However, these numerical values are not restrictive, and Ra1 may be 10 nm or more if a specification required for lens is satisfied. Additionally, when the viscosity of the material used is high, for example, Ra2 may be 200 nm or more. In short, the important thing is that Ra2 is larger than Ra1 in order to obtain the effect that the contact area is small so as to reduce the stress generated on the glass material.

As described above, by providing the fine shapes 201 or 720 on the step transfer surface 103 or 703 such that the surface roughness Ra2 of the step transfer surface 103 or 703 is larger than the surface roughness Ra1 of the diffraction action transfer surface 102 or 702, the demoldability of the glass material 301 is improved. Accordingly, it is possible to form the glass optical lens 601 such that the glass material can be prevented from adhering.

Moreover, even if the glass material is prevented from adhering, in a case where the fine shapes 201 or 720 are not provided on the step transfer surface 103 or 703, a stress generated on the step transfer surface 103 or 703 may be different from a stress generated on the diffraction action transfer surface 102 or 702, at the time of demolding. Consequently, variation of shapes of the glass optical lenses 601 is possibly caused and some glass optical lenses 601 may have unexpected aberration. On the other hand, by providing the fine shapes 201 or 720 on the step transfer surface 103 or 703 such that the surface roughness Ra2 of the step transfer surface 103 or 703 is larger than the surface roughness Ra1 of the diffraction action transfer surface 102 or 702, the difference in stress at the time of demolding becomes smaller between the step transfer surface 103 or 703 and the diffraction action transfer surface 102 or 702. Accordingly, the optical characteristic of a lens formed by a mold with the aforementioned structure is more desirable than that of a lens formed by a conventional mold.

When a glass optical lens having a diffraction shape in the present invention is used as an optical device, it is possible to realize a reduction of the number of the BD pickup lenses, and a reduction of the number of the DSC lenses and its compactification.

Furthermore, in the aforementioned second embodiment, demolding films are formed not only on the surface of the forming mold material 801 but also on the surface of the flat mold material 802. However, no demolding films may be formed on the flat mold material 802, which does not have a step transfer surface or the like.

Moreover, in the aforementioned first and second embodiments, the fine shapes 201 and 720 have rectangular-groove structure. However, a fine shape 3001 which has structure with plural V-grooves 3001a may be formed as shown in FIG. 14(A), or a fine shape 3002 which has structure with plural cylindrical grooves 3002a may be formed as shown in FIG. 14(B). Alternatively, rectangular-groove structure, V-groove structure and cylindrical groove structure may be randomly arranged on the step transfer surface 103, and the structure does not have to be symmetric. Here, cylindrical groove structure is excellent in that it is not easily broken or polluted compared to rectangular-groove structure and V-groove structure.

Moreover, the grooves formed in the fine shapes 201 and 720 are, as shown in FIG. 6, formed parallel to the axis N, but do not have to be formed parallel to the axis N. As a fine shape 2002 shown in FIG. 15(A), a plurality of grooves 2002a, each of which has a rectangular section, may be formed around the step transfer surface 103.

Moreover, a plurality of grooves, whose directions and shapes are different from each other, may be formed. In this case, the demoldability is reduced compared to the structure with grooves formed only along the demolding direction, but the stress generated can be reduced compared to the case without fine structure formed because the contact area of the step transfer surface to the glass material can be reduced.

However, even in a case where grooves are not parallel to the axis N, it is desirable that they are formed to be inclined at least from the minus side of the Z axis toward the plus side since the demoldability is improved because, if the glass material bites the grooves, the glass material comes out at the time of demolding along the direction in which the grooves are formed.

Furthermore, as a fine shape 2003 shown in FIG. 15(B), grooves 2003a may be formed with rectangular-groove structure as shown in FIG. 6 such that their widths h grow along the plus direction of the Z axis. Then, the demoldability can be further improved.

Furthermore, the above explanations are given assuming that indentation patterns are formed on the diffraction action transfer surface 102 or 702 and the step transfer surface 103 or 703. Alternatively, for example, a step-like pattern or a rectangular concavo-convex pattern may be formed. The important thing is that the diffraction action transfer surface 102 or 702 and the step transfer surface 103 or 703 are provided.

Furthermore, the above explanations are given assuming that a planar diffraction shape is used. Alternatively, a spherical diffraction shape or an aspherical diffraction shape may be used, and diffraction shapes may be provided on both surfaces.

EXAMPLE

In the following, examples of the present invention will be described. A pressing mold for optical lenses similar to that of the first embodiment is used in the present example; cemented carbide mainly containing WC is selected for the forming mold 501, the diameter of which is 3.5 mm. The number of the diffraction ring zones is 110, and the height of the diffraction step 0.7 µm. The diffraction shape transfer portion 101 is formed such that the pitches P are designed to become smaller toward the outer periphery; the pitch P of the diffraction ring zone closest to the rotation center is 110 µm, and the pitch P at the outermost is 5 µm. The diffraction shape transfer portion 101 is formed by ultra-precise grinding process with rotating tool of sintered body of diamond particle.

Also for the flat mold 502, as is the case in the forming mold 501, cemented carbide mainly containing WC is used and it is manufactured such that the diameter is 3.5 mm. The planar portion of the flat mold 502 is, after surface grinding process with No. 800 count metal bond grinder, finished to be in a mirror surface state of surface roughness Ra=5 nm by polishing with diamond slurry having a particle diameter of 1 µm.

The diffraction action transfer surface 102 of the forming mold 501 is formed such that the surface roughness Ra1 is 4 nm. The step transfer surface 103 is formed such that the surface roughness Ra2 is 24 nm and the inclined angle θ1 is 8°.

Figure 16:
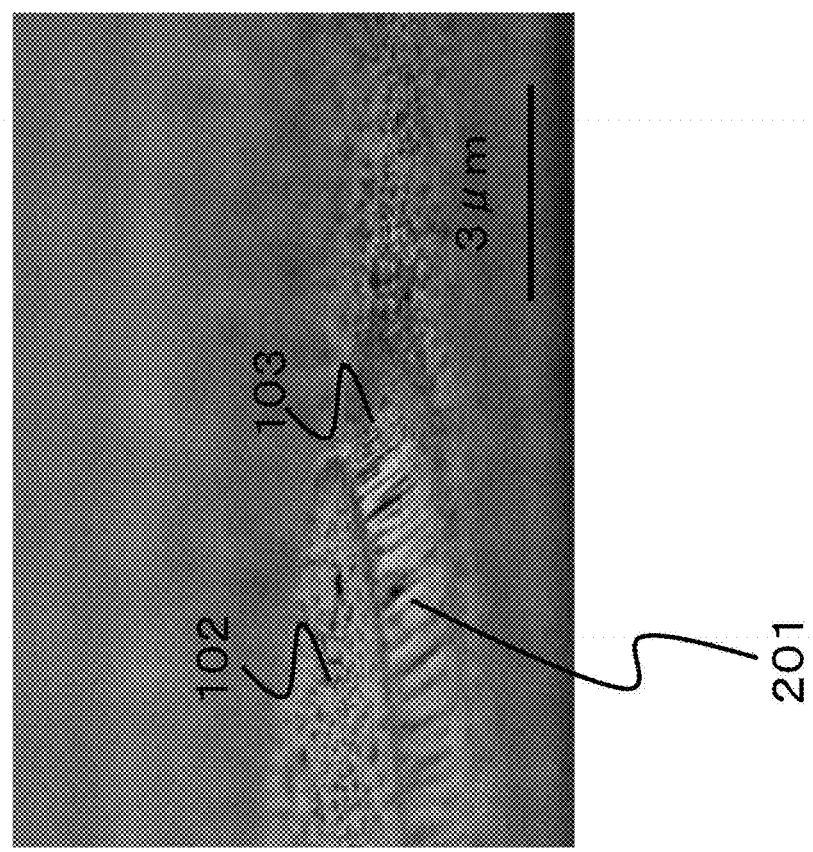
FIG. 16 is a view showing an SEM image of the forming mold according to an example of the present invention.

FIG. 16 is an enlarged SEM image of the diffraction action transfer surface 102 and the step transfer surface 103 of the forming mold 501 formed. Viewing FIG. 16, the fine shape 201 is recognized to be formed along the step surface inclined of the step transfer surface 103.

Next, the molding process will be described. VC79 manufactured by Sumita Optical Glass, Inc. (refractive index is 1.609, dispersion is 57.8, glass transition temperature is 516° C., and coefficient of thermal expansion is $93 \times 10^{-9}$) is used as the glass material 301. The temperature at the time of heating is 610° C., and the press molding is performed under a nitrogen atmosphere.

Figure 17:
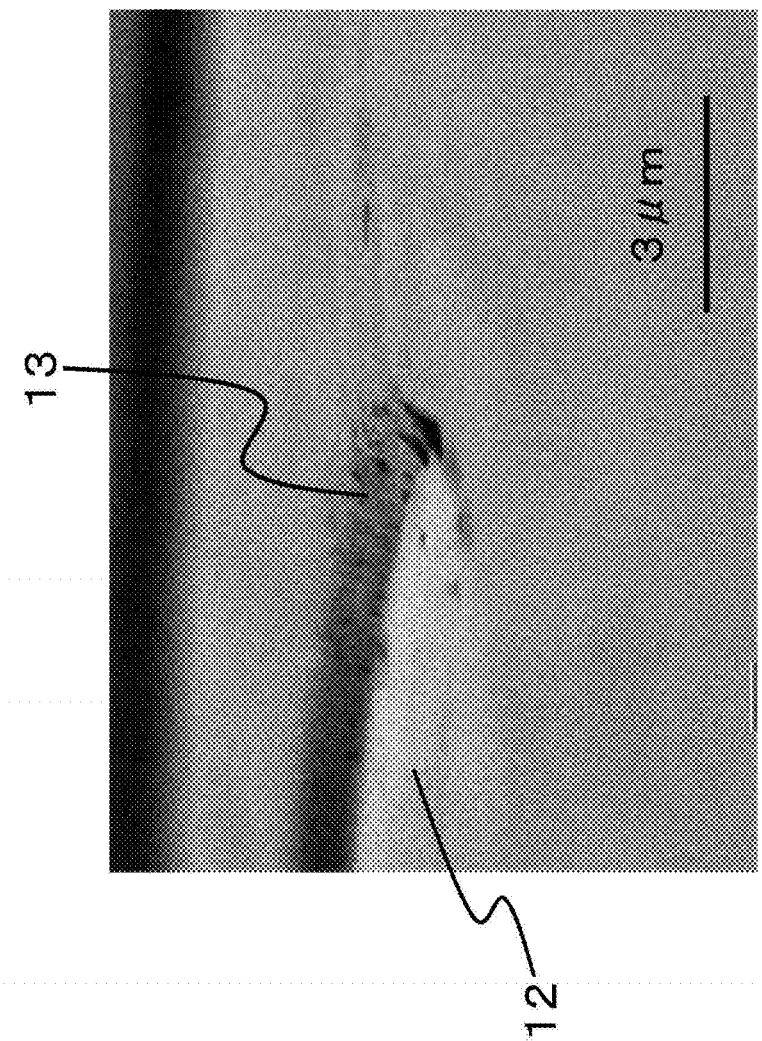
FIG. 17 is a view showing an SEM image of the glass optical lens according to the example of the present invention.

In the demolding process, cooling is performed to lower the temperature to 100° C., and the glass optical lens 601 is demolded from the forming mold 501. A portion of the glass optical lens 601 formed with inverted patterns corresponding to FIG. 16 is shown in FIG. 17. In FIG. 17, the diffraction action surface 12 and the step surfaces 13 of the glass optical lens 601 can be recognized. As shown in FIG. 17, the glass material is prevented from adhering, and the transcription pattern is understood to be satisfactory.

Figure 18:
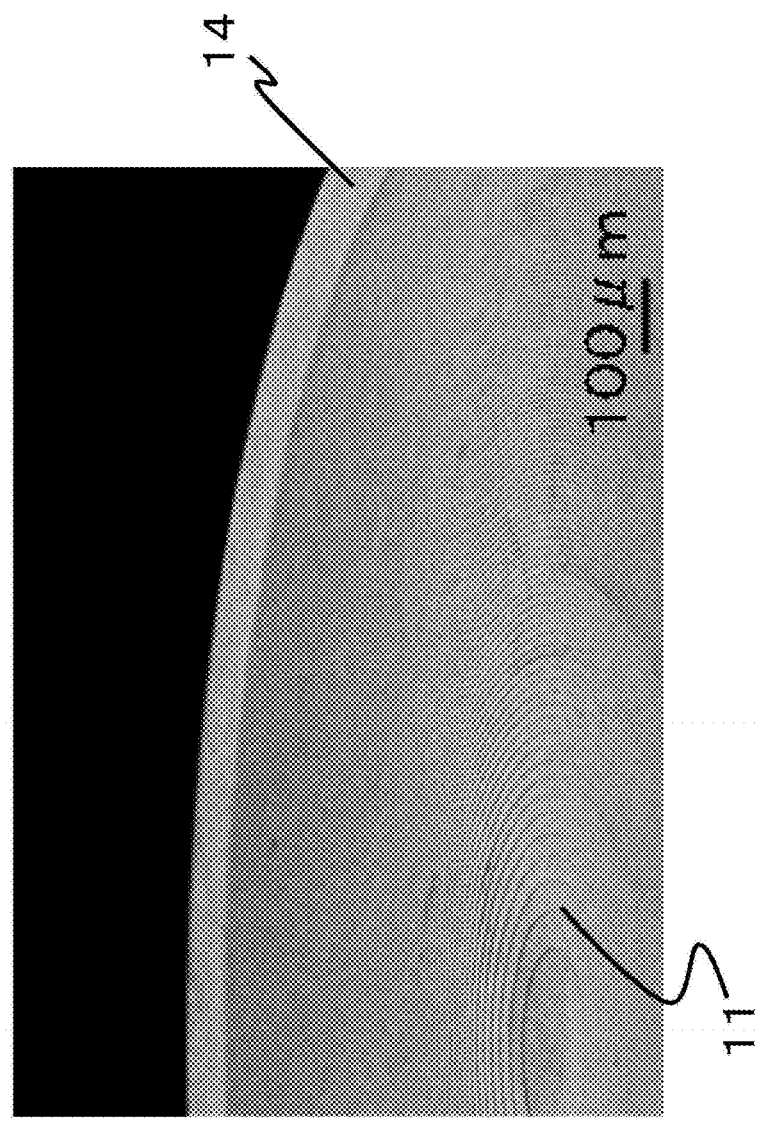
FIG. 18 is a view showing an SEM image of the glass optical lens according to the example of the present invention.

Further, FIG. 18 is an SEM image showing the entire glass optical lens 601 formed. The glass material is prevented from adhering all over the glass optical lens 601, and thus the transcription pattern is understood to be satisfactory.

Figure 19:
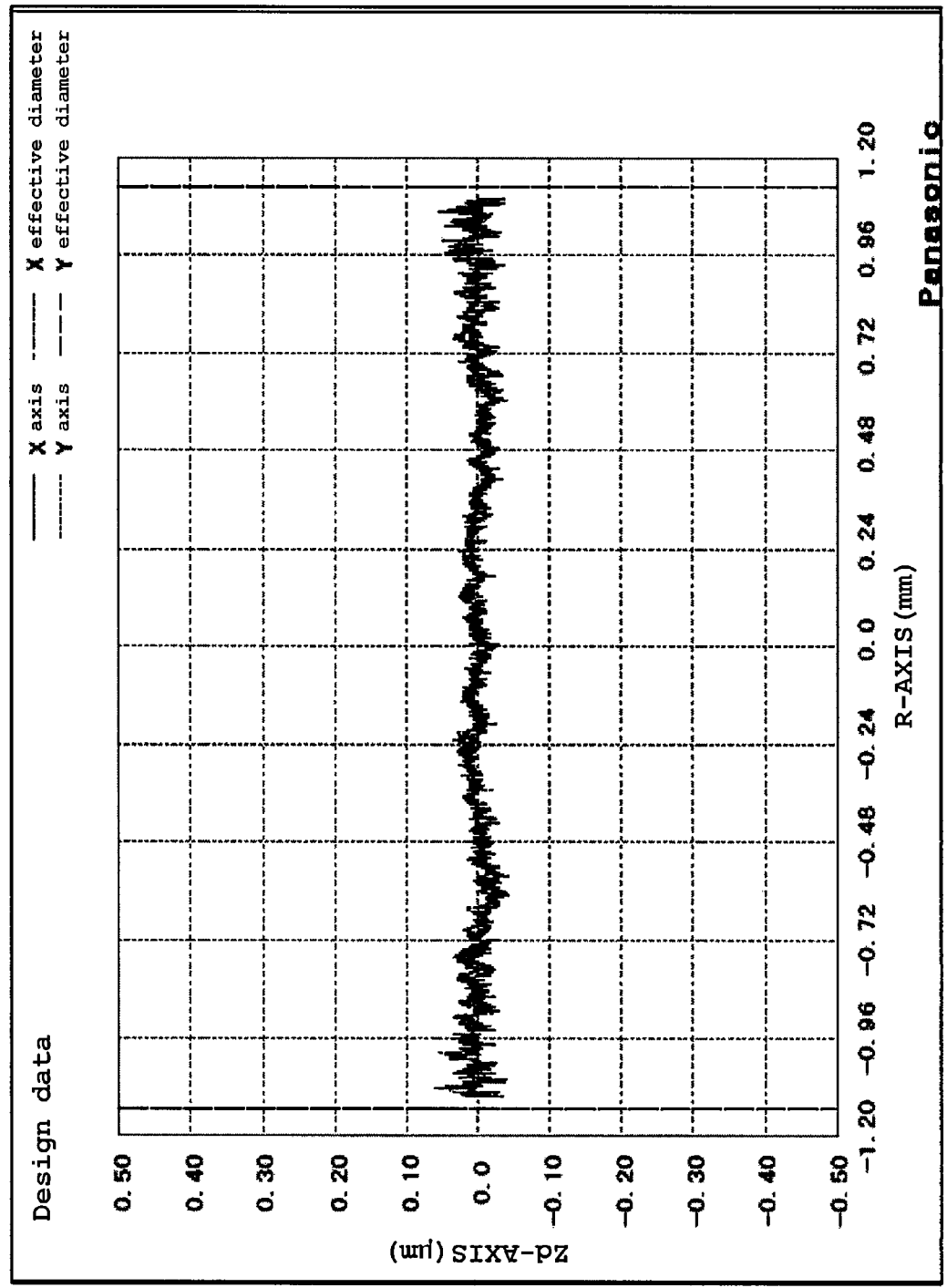
FIG. 19 is a view showing a measurement result of the pattern accuracy with respect to the X and Y directions of the forming mold according to the example of the present invention.

FIG. 19 is a view that shows a measurement result of the amounts of differences from the designed shape, which was obtained by measuring the diffraction shape transfer portion 101 of the forming mold 501 with UA3P manufactured by Panasonic Corporation. A diamond probe with a tip of 1 µmR is used for measurement, and the noises generated due to probing errors at the time of measurement are rejected. Measurements are performed with respect to the ±X and Y directions within a radius of 1.2 mm of the rotation center. The measurement result of the X direction is denoted with a solid line while that of the Y direction is denoted with a dotted line.

Figure 20:
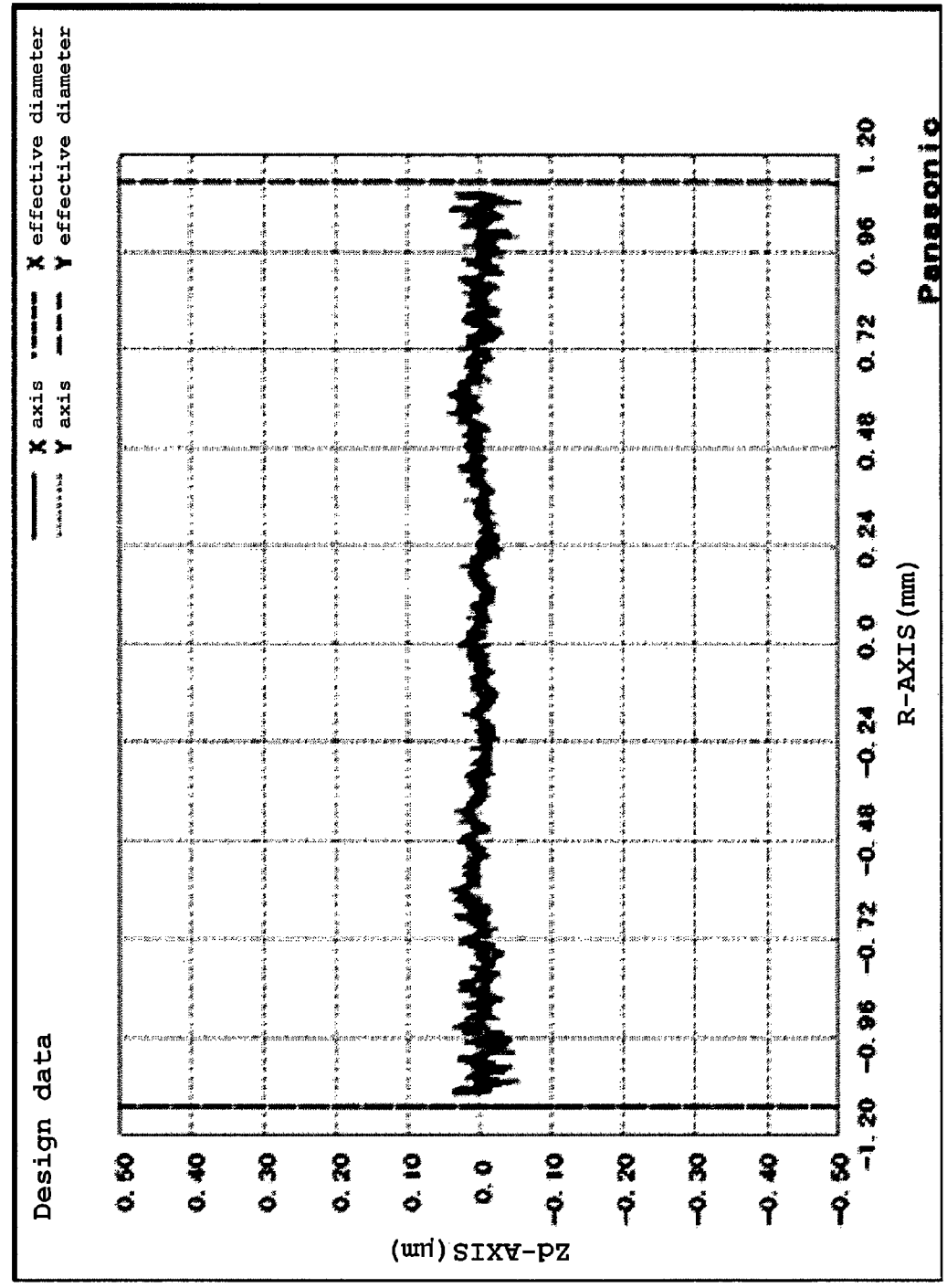
FIG. 20 is a view showing a measurement result of the pattern accuracy with respect to the X and Y directions of the glass optical lens according to the example of the present invention.

Further, FIG. 20 is a view that shows a measurement result which was obtained, with a similar measurement method, by measuring the surface of the diffraction shape portion 11 of the glass optical lens 601. The measurement result of the X direction is denoted with a solid line while that of the Y direction is denoted with a dotted line.

In view of FIGS. 19 and 20, the shape of the patterned surface of the forming mold 501 is satisfactorily transferred onto the glass optical lens 601.

Further, the present invention is not restricted to the aforementioned examples. Numerous variations, which are possible based on the spirit of the present invention, will not be excluded from the scope of the present invention.

The pressing mold for optical lenses of the present invention, which provides the effect that the stress generated on the lens at the time of demolding can be reduced to prevent the glass from adhering at the time of molding, is applicable to a method for manufacturing glass optical lenses and the like.

What is claimed is:

1. A pressing mold for optical lenses, which molds a ring-zone-type diffraction lens having a plurality of concentric ring zones, the mold comprising:
    diffraction action transfer surfaces configured to form diffraction action surfaces that diffract light passing through the diffraction lens; and
    step transfer surfaces configured to form step surfaces that connect the adjacent diffraction action surfaces of the diffraction lens, wherein
    surface roughness of the step transfer surfaces is larger than surface roughness of the diffraction action transfer surfaces,
    wherein fine grooves are formed on the step transfer surfaces, and
    a direction of the fine groove is a direction of a rotation axis of the concentric ring zone.

2. The pressing mold for optical lenses according to claim 1, wherein
    the surface roughness Ra1 of the diffraction action transfer surfaces and the surface roughness Ra2 of the step transfer surfaces satisfy $$Ra1 < 10 \text{ nm}, \quad \text{(Expression 1)}$$

and $$10 \text{ nm} < Ra2 < 200 \text{ nm}. \quad \text{(Expression 2)}$$

3. The pressing mold for optical lenses according to claim 2, wherein
    Ra2 satisfies, (i) when press molding is performed under inert gas atmosphere, $$10 \text{ nm} < Ra2 < 200 \text{ nm}, \quad \text{(Expression 2)}$$

and (ii) when press molding is performed under vacuum atmosphere, $$10 \text{ nm} < Ra2 < 100 \text{ nm}. \quad \text{(Expression 3)}$$

4. The pressing mold for optical lenses according to claim 1, wherein
    at least in a cross section including the rotation axis of the concentric ring zone, the step transfer surface is inclined by $\theta 1$ from one axis parallel to the rotation axis such that $$0° \leq \theta 1 < 10° \quad \text{(Expression 4)}$$

is satisfied, and the fine groove is formed to be parallel to another axis inclined by $\theta 1$ from one axis parallel to the rotation axis.

5. The pressing mold for optical lenses according to claim 1, wherein
    the fine groove is shaped like at least one of a rectangular groove, a V-groove and a cylindrical groove.

6. The pressing mold for optical lenses according to claim 1, wherein
    a pitch of the diffraction action transfer surface becomes larger toward a center of a rotation axis of the concentric ring zone.

7. The pressing mold for optical lenses according to claim 1, wherein
    mold material is at least one of cemented carbide mainly containing tungsten carbide (WC), titanium carbide (TiC), silicon carbide (SiC), and glassy carbon (GC).

8. The pressing mold for optical lenses according to any one of claims 1 to 3 and 4 to 7, wherein
    the diffraction action transfer surfaces and the step transfer surfaces are surfaces of amorphous alloy films formed on mold materials,
    the amorphous alloy films are alloy films containing at least one of platinum (Pt), rhodium (Rh), iridium (Ir), ruthenium (Ru), rhenium (Re), tungsten (W), tantalum (Ta), carbon (C) and Osmium (Os), and
    surface roughness Ra3 of portions of the mold material corresponding to the step transfer surfaces satisfies $$200 \text{ nm} \leq Ra3 \leq 400 \text{ nm}. \quad \text{(Expression 5)}$$

9. The pressing mold for optical lenses according to any one of claims 1 to 3 and 4 to 7, wherein
    the diffraction action transfer surfaces and the step transfer surfaces are surfaces of mold materials.

10. A method for manufacturing glass optical lenses, using the pressing mold for optical lenses according to claim 1, the method comprising:
    a heating step of heating glass material, which is to be softened, to a glass-transition temperature or higher;
    a pressing step of pressing the softened glass material; and
    a demolding step of demolding, after the pressing step, the glass material cooled to the glass-transition temperature or lower, from the pressing mold for optical lenses.

11. The method for manufacturing glass optical lenses according to claim 10, wherein
    an upper limit value of surface roughness Ra2 of the step transfer surfaces, which is allowed in a case where the pressing step is performed under inert gas atmosphere, is larger than an upper limit value of Ra2, which is allowed in a case where the pressing step is performed under vacuum atmosphere.

* * * * *